(12) United States Patent
Kastroulis

(10) Patent No.: US 12,069,100 B2
(45) Date of Patent: Aug. 20, 2024

(54) SYSTEMS AND METHODS FOR GRAPH-BASED ACCESS CONTROL

(71) Applicant: CARRERA GROUP, INC., Jacksonville Beach, FL (US)

(72) Inventor: Angelo Kastroulis, Jacksonville Beach, FL (US)

(73) Assignee: CARRERA GROUP, INC., Jacksonville Beach, FL (US)

( * ) Notice: Subject to any disclaimer, the term of this patent is extended or adjusted under 35 U.S.C. 154(b) by 199 days.

(21) Appl. No.: 17/566,881

(22) Filed: Dec. 31, 2021

(65) Prior Publication Data

US 2022/0210201 A1  Jun. 30, 2022

Related U.S. Application Data

(60) Provisional application No. 63/133,050, filed on Dec. 31, 2020.

(51) Int. Cl.
*H04L 9/40* (2022.01)
*G06F 21/62* (2013.01)

(52) U.S. Cl.
CPC .......... *H04L 63/20* (2013.01); *G06F 21/6218* (2013.01); *H04L 63/10* (2013.01)

(58) Field of Classification Search
CPC ....... H04L 63/20; H04L 63/10; H04L 63/104; H04L 63/0227; H04L 63/205; H04L 63/101; H04L 63/105; H04L 9/40; G06F 21/6218

See application file for complete search history.

(56) References Cited

U.S. PATENT DOCUMENTS

| | | | |
|---|---|---|---|
| 2015/0269383 A1* | 9/2015 | Lang | G06F 21/57 726/1 |
| 2022/0156393 A1* | 5/2022 | Butcher | G06F 21/6218 |

* cited by examiner

*Primary Examiner* — Quazi Farooqui
(74) *Attorney, Agent, or Firm* — Volpe Koenig

(57) ABSTRACT

In some aspects, the disclosure is directed to methods and systems for graph-based analysis, filtering, and access control. A knowledge graph may be generated for a resource and/or group of resources, with connections from nodes representing entities (e.g. devices, users, user groups, etc.) into nodes associated with the resource identifying access policies and authorization levels. Access controls may be applied in real time, and data may be dynamically filtered or cleaned to prevent exfiltration and protect privacy. Rules need not be explicitly or manually encoded, but rather may be implicit through the connections between resource nodes and entity nodes, allowing for high scalability.

19 Claims, 6 Drawing Sheets

SYSTEMS AND METHODS FOR GRAPH-BASED ACCESS CONTROL

RELATED APPLICATIONS

This application claims the benefit of and priority to U.S. Provisional Patent Application No. 63/133,050, entitled "Systems and Methods for Graph-Based Access Control," filed Dec. 31, 2020, the entirety of which is incorporated by reference herein.

FIELD OF THE DISCLOSURE

This disclosure generally relates to systems and methods for resource access control. In particular, this disclosure relates to systems and methods for graph-based control of filtering and access policies.

BACKGROUND OF THE DISCLOSURE

Access control techniques provide important security features for computing systems, including controlling remote access to resources (e.g. files, web applications, databases, servers, etc.), preventing data exfiltration, protecting privacy of users and/or user data, and otherwise maintaining the integrity of the computing systems. However, many access control techniques require explicitly coded policies or rules that may be time-consuming to generate, may be prone to configuration errors, and may be difficult to scale to large numbers of resources. As a result, in computing environments in which very large amounts of data are frequently generated, access control policies tend to be simplistic and naive or at a low level of granularity (e.g. applying the same policies to all resources for a user or group, etc.). In some implementations, due to large numbers of policies to be applied to a similarly large number of resources, access control techniques may be quite slow and add significant latency, as well as consuming large amounts of memory and/or processor resources. This also prevents dynamic access control or applying policies in real-time as data traverses the system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for graph-based access control; and Section B describes a computing environment which may be useful for practicing embodiments described herein.

A. Systems and Methods for Graph-Based Access Control

Many computing systems provide access to resources to local and remote computing devices or users, with resources including data of any type (e.g. text, databases, images, audio or video, animations, executable code, web pages, etc.) and/or executable resources (e.g. hosted or virtual desktops or machines, web applications or software-as-a-service (SaaS) applications, etc.). In many instances, access to these resources should not be unlimited, as the local or remote computing device or user may not be completely trusted or privileged to access the data or resources. Access control techniques may provide important security features for computing systems, including controlling remote access to resources, preventing data exfiltration, protecting privacy of users and/or user data, and otherwise maintaining the integrity of the computing systems.

Figure 1A:
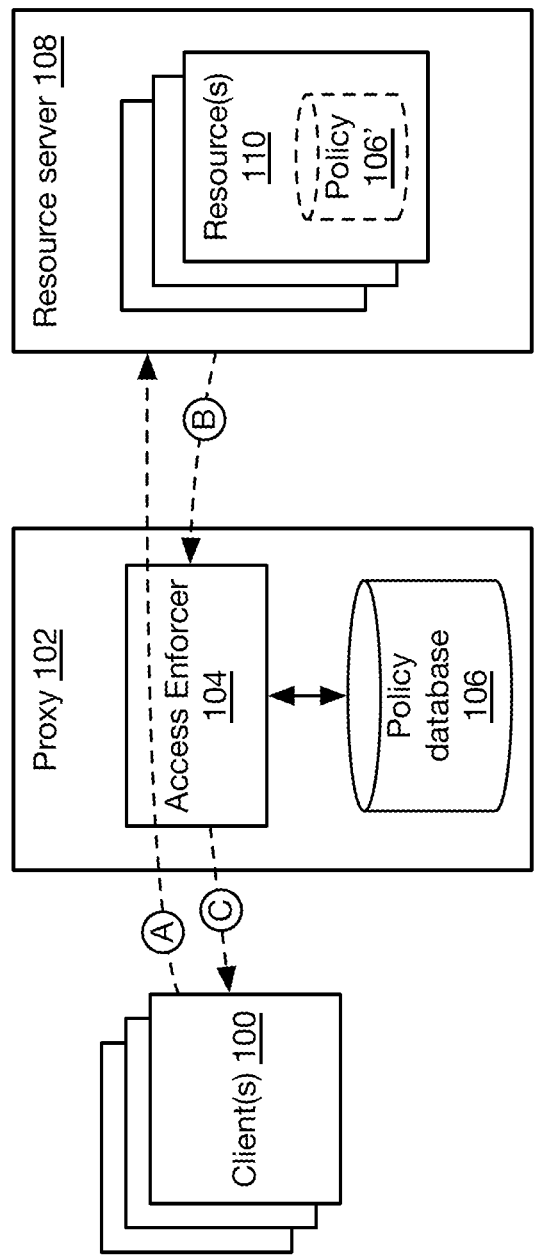
FIG. 1A is an illustration of a computing environment for controlling access to resources, according to one implementation.

FIG. 1A is an illustration of a computing environment for controlling access to resources, according to one implementation. One or more computing devices 100, referred to various as client devices, user devices, clients, or by similar terms, may communicate via one or more networks (not illustrated) with a resource server 108, with such communications (e.g. requests and responses) traversing a proxy computing device 102, referred to variously as a proxy, an intermediary, an access control device, a firewall, a load balancing proxy, or by other similar terms. Although shown separately, in some implementations, proxy 102 and resource server 108 may be the same computing device. Furthermore, although shown as single device(s), proxy 102 and/or resource server 108 may comprise a plurality of computing devices (e.g. a server farm, a cloud of virtual machines executed by one or more physical computing devices, a cluster of computing appliances, etc.).

Clients 100, which may comprise desktop computers, laptop computers, tablet computers, wearable computers, embedded computers, console devices, smart appliances, servers, virtual machines executed by physical machines, or any other type and form of computing device, may transmit requests (A) for access to resources 110 to a resource server 108 via a proxy 102. In some implementations, an access enforcer 104 executed by proxy 102 may intercept and forward the requests to one or more resource servers 108 (e.g. for load balancing purposes). In some implementations, access enforcer 104 may determine whether access to a resource 110 is allowed at all for the requesting client (e.g. based on an access policy in a database 106 stored in memory of the proxy 102, or in a policy 106' attached to the requested resource 110), and may block requests if access is not allowed or forward or redirect the request if access is allowed.

Upon receipt of the request, resource server 108 may respond (B) with the requested resource 110 (or data or executable code associated with access to the resource, such as an access or authentication token, session establishment packet, or other such data). Upon receipt, in some implementations, proxy 102 may forward (C) the resource 110 (or associated data or executable code) to the client.

As discussed above, many access control techniques require explicitly coded policies or rules that may be time-consuming to generate, may be prone to configuration errors, and may be difficult to scale to large numbers of resources. For example, a policy table may identify clients allowed or not allowed access to a given resource, such as:

| Source address | Source port | User ID | Device ID | Policy |
| --- | --- | --- | --- | --- |
| 1.2.3.4 | 80 | 0101 | 5010 | Allow |
| * | * | 0101 | * | Allow |
| 2.3.4.5 | * | * | 5020 | Filter |
| 3.4.5.6 | * | * | * | Block |

Although only a few identifiers are shown, in many implementations, additional identifiers may be utilized such as user group identifiers, device type identifiers, application version or operating system identifiers, etc. As shown, policies may include allowing access, blocking access, or partially blocking access (e.g. filtering access to the resource, such as providing access to only a portion of the resource or redacting or removing data from the resource prior to providing the resource to the client device).

As shown, in some implementations, entries may be partial or include wildcards (e.g. such that all requests from IP address 3.4.5.6 are blocked, as shown in the example above), reducing the number of individual entries necessary (e.g. as opposed to having thousands of 'block' entries for each potential source port, user ID, and device ID associated with the source address 3.4.5.6). While this may reduce the overall size of the table, the table may still be quite large to accommodate many different access control requirements. Additionally, because each resource needs a corresponding associated table, the required policy database may be huge. Applying these policies (including searching for the proper policy to apply to any given request) may be quite slow and add significant latency, as well as consuming large amounts of memory and/or processor resources. Additionally, because the policies are typically manually generated, they may be prone to typographical errors, and may be overly simplistic (e.g. blocking all requests from wide ranges of IP addresses associated with a specific country, and thus unable to properly account for when an authorized user travels to the country and wishes to access a resource).

The systems and methods described herein provide an improvement over table-based access control implementations through the use of graph-based analysis techniques. A knowledge graph may be generated for a resource and/or group of resources, with connections from nodes representing entities (e.g. devices, users, user groups, etc.) into nodes associated with the resource identifying access policies and authorization levels. Implementations utilizing a graph-based approach may be substantially faster than table-based access controls, particularly with very large and complex policy sets and large numbers of resources. Access controls may be applied in real time, and data may be dynamically filtered or cleaned to prevent exfiltration and protect privacy. Rules need not be explicitly or manually encoded, but rather may be implicit through the connections between resource nodes and entity nodes, allowing for high scalability.

Figure 1B:
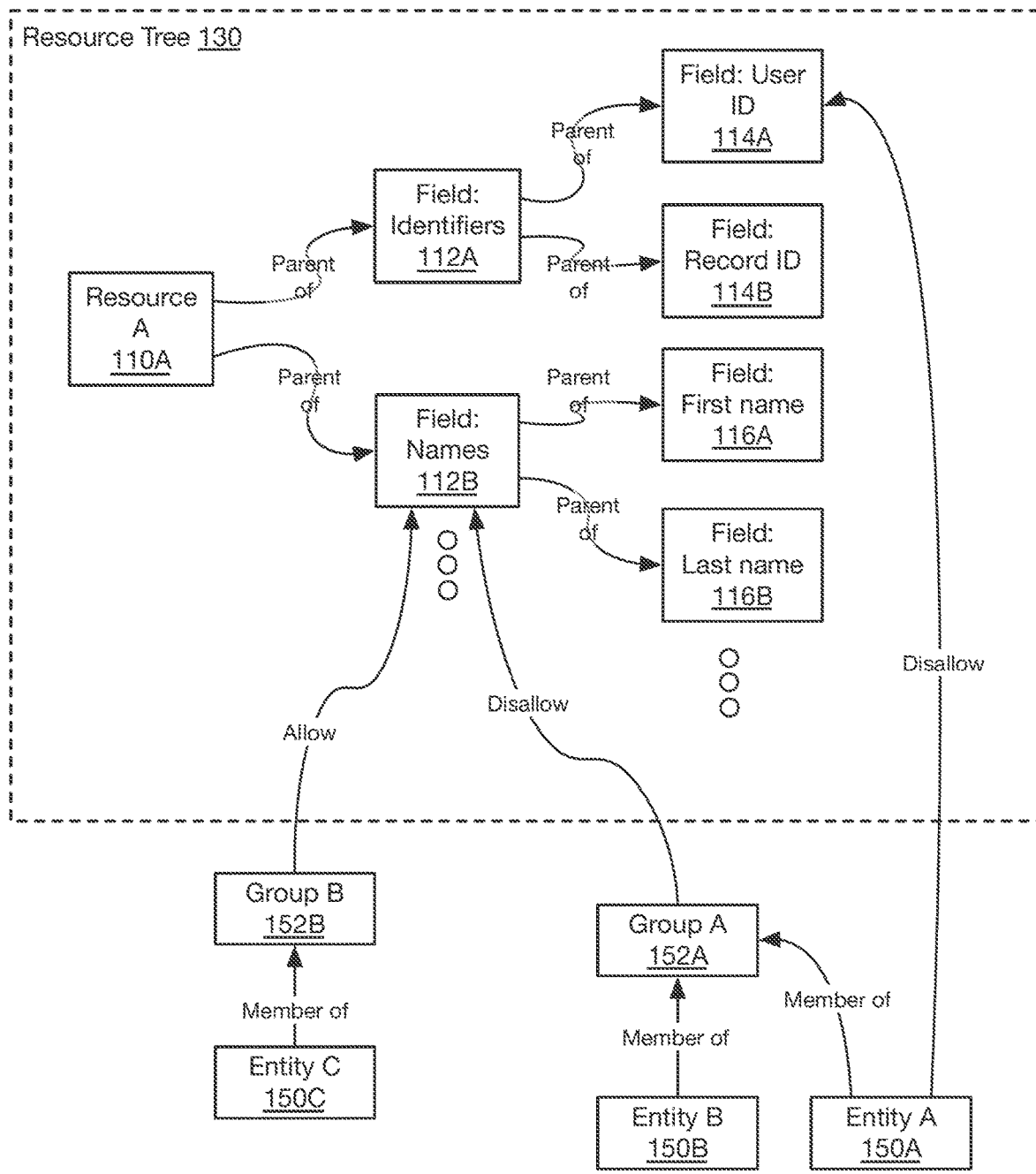
FIG. 1B is an illustration of an example of an access control graph, according to one implementation.

FIG. 1B is an illustration of an example of an access control graph, according to one implementation. A resource 110A may be associated with a plurality of nodes 112-116 within a resource tree 130, with the resource (or an identifier of the resource, such as a URL or file path or similar identifier) associated with a root node of the tree 130. The root node may be a parent of one or more nodes 112A-112B at a first hierarchical level; and each node at the first hierarchical level may similarly be a parent of zero, one, or more nodes (e.g. nodes 114A-114B, 116A-116B) at a second hierarchical level. Additional levels (not illustrated) may be utilized in order to provide a resource tree that represents all of the data or types of data of a resource. While discussed above in terms of parental relationships, the resource tree 130 may also be considered as nodes having child relationships to other nodes at higher layers in the hierarchy.

External to each resource tree 130, nodes representing entities such as groups 152A-152B or users 150A-150C (or devices, source addresses, client identifiers, or similar identifiers or groups of identifiers) may be used to define filter or access control logic. In many implementations, entity nodes may be children or members of other entity nodes, as shown. Entity nodes may connect via an edge associated with a policy to nodes within one or more resource trees 130, such as an "allow" or "disallow" edge as shown. For example, a "disallow" edge connecting a group (such as group A 152A) to a node (such as names 112B) may indicate that members of the group are not permitted to view data associated with the node (as well as its child nodes), and such data may be filtered by the proxy from the data stream provided to the client. Under the policy shown, for example, a client device such as entity A (represented by node 150A) may request and receive access to resource A (represented by node 110A and resource tree 130), and receive data associated with record identifiers (represented by node 114B), but may be blocked from receiving user identifiers (node 114A) or names (nodes 116A-116B), with data associated with those blocked nodes filtered by the proxy during redirection and forwarding of the resource from the server to the client.

The knowledge graph for each resource may be generated in various ways, depending on implementation. For example, in some implementations, data may be provided in a hierarchical or nested format, such as XML data or a similar structure in which hierarchical relationships are implied or explicit within the data (e.g. one or more child fields within tags associated with a parent field, etc.), or a document-object-model (DOM) tree of a resource. In other implementations, the knowledge graph for a resource may be generated by using a sequentially arranged inverted index of locations associated with data of the resource and scanning the index for associated data; creating an in-memory linked list of all nodes for main-memory traversal during execution or processing of a resource; using a B-tree structure or similar structure with a hashed "bucket" of adjacent nodes; or by other such methods. Similarly, connections or associations between entity nodes may be generated in various methods, including encoding each entity as a node within a graph (e.g. based on vectors of device identifiers, client identifiers, addresses, usernames, or other such identifiers, etc.) and building a hashed index of walks between them.

Accordingly, rather than using table-based rules which may have coarse granularity or may need to be encoded within application logic to provide finer grained control over access to data fields within a resource, a hierarchical graph of the resource tree may be generated and the proxy may dynamically determine how to filter data during processing. Additionally, because the resource tree is relatively light-weight and easy to re-encode, the tree may be dynamically re-generated as needed, allowing for policies to evolve over time as the underlying data changes or is reorganized.

Figure 2:
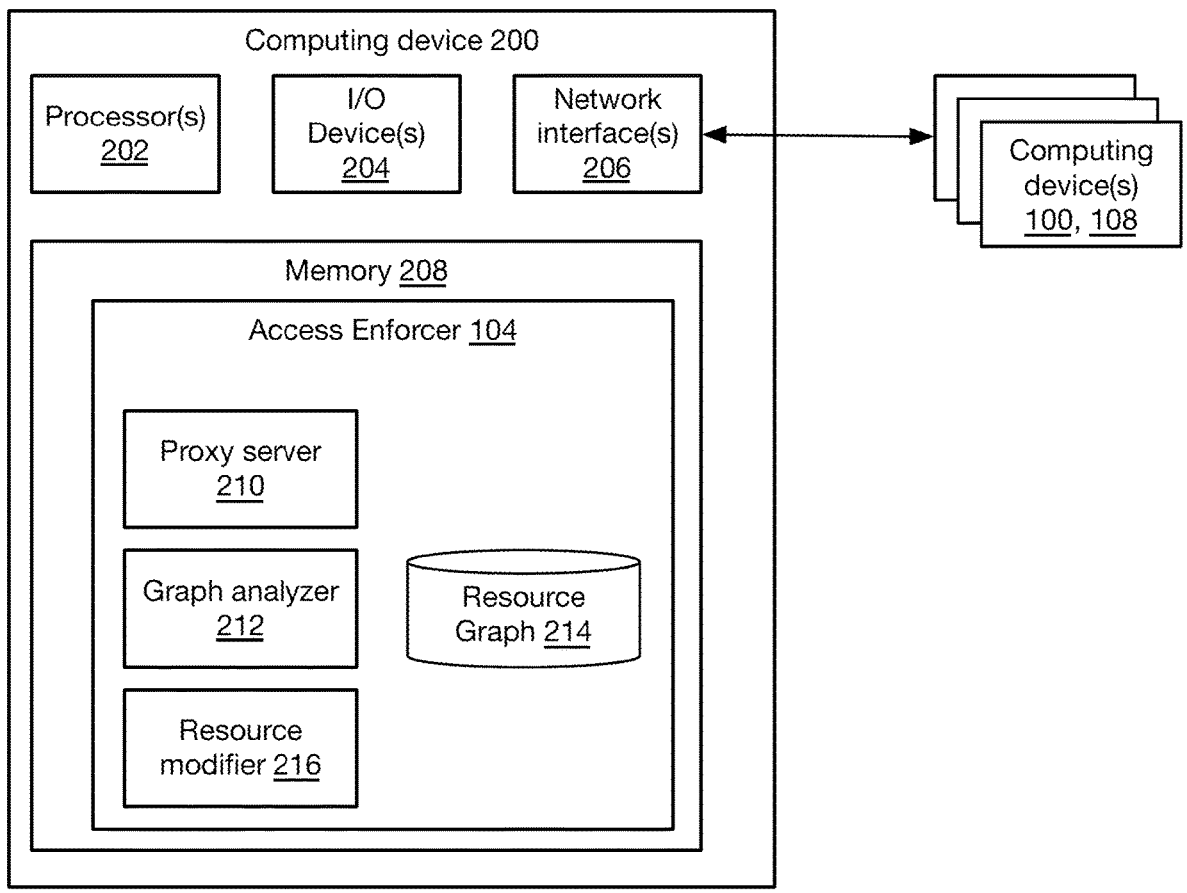
FIG. 2 is a block diagram of a system for controlling access to resources, according to some implementations.

FIG. 2 is a block diagram of a system for controlling access to resources, according to some implementations. A computing device 200, which may comprise a desktop computer, laptop computer, tablet computer, embedded computer, cluster or farm of servers, appliance, a virtual computing device executed by one or more physical computing devices (e.g. a cloud), or any other such device, may comprise one or more processing units 202 (which may include graphics processing units (GPUs), and other co-processors such as tensor processing units (TPUs)), one or more input/output devices 204 (e.g. displays, keyboards, flash card readers, etc.), and one or more network interfaces 206 for communicating with one or more other computing device (e.g. for retrieving data, receiving queries, providing results, and/or subdividing queries amongst a plurality of computing devices for scalability). Computing device 200 may comprise a memory device 208, which may store an access enforcer 104 for execution by processors 204.

Access enforcer 104 may comprise an application, service, server, daemon, routine, or other executable logic for providing proxy services, including access control and/or filtering or modification of data or resources, between one or more computing devices 100, 108, such as clients and servers. Access enforcer 104 may be referred to variously as a proxy service, a rewriting proxy, a filtering proxy, or by other similar terms in various implementations.

In some implementations, access enforcer 104 may comprise a proxy server 210. Proxy server 210 may comprise an application, service, server, daemon, routine, or other executable logic for providing proxying services or acting as an intermediary for communications between clients and servers. Proxy server 210 may intercept or receive requests from clients and responses from servers and rewrite packet headers (e.g. performing network address translation or similar redirection) to forward the requests and responses to a corresponding destination server or client. In some implementations, proxy server 210 may perform authentication features, such as comparing security tokens or credentials of a client device to a list of authorized users or tokens. In some implementations, proxy server 210 may perform load balancing features, and may select a server from a plurality of servers to serve a requested resource. In some implementations, proxy server 210 may provide other acceleration features, such as data compression, caching, transport layer connection pooling, or other such features.

In some implementations, access enforcer 104 may comprise a graph analyzer 212 and a resource graph 214. As discussed above, a resource graph 214 may be generated with a tree of hierarchical nodes in parent-child relationships representing fields or data types within a resource, and connections to entities external to the tree (e.g. users, groups, devices, addresses, etc.) representing access or filtering policies. As discussed above, the graph or trees may be generated automatically in many implementations. Although shown internal to access enforcer 104, the resource graph 214 may be stored separately in memory 208, on external memory storage, on a network server, or any other suitable location. Resource graph 214 may be stored in any suitable format, including as a relational database, data array, XML data, or any other type and form of data. Graph analyzer 212 may comprise an application, service, server, daemon, routine, or other executable logic for generating, parsing, and/or analyzing graphs. For example, graph analyzer 212 may be configured to perform distance analysis between nodes (e.g. walking edges of the graph with associated costs) to identify similar nodes or clusters of nodes, or otherwise select nodes or apply filtering or access control rules to nodes.

In some implementations, access enforcer 104 may comprise a resource modifier 216. As discussed above, resource modifier 216 may comprise an application, service, server, daemon, routine, or other executable logic for modifying data values or the contents of a resource according to policies determined via analysis of a resource graph 214. Resource modifier 216 may, for example, remove data values from selected fields within a resource or replace data values with null values or random values, in various implementations. In some implementations, resource modifier 216 may rewrite or modify data as it is received from a resource server for forwarding to a client in real time. For example, the resource may be received in an uncompressed or parseable format (e.g. XML data, HTML data, etc.), and the resource modifier 216 may identify tags corresponding to selected fields (e.g. having specified field identifiers) and remove or replace data within the corresponding tags. Because this may be done in real time, the rules may be dynamically modified and applied, even as a client is accessing a resource.

Figure 3:
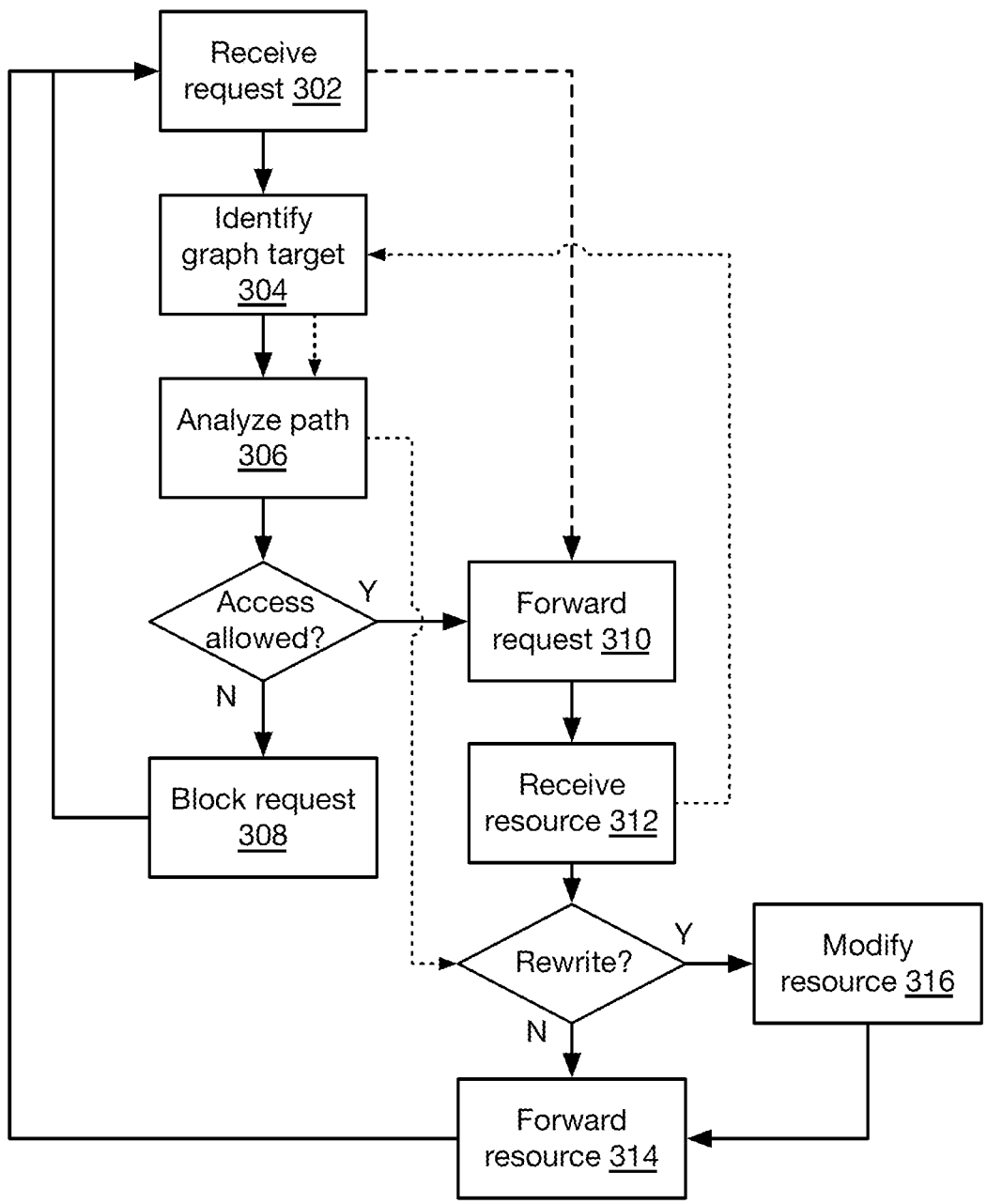
FIG. 3 is a flow chart of a method for controlling access to resources, according to some implementations.

FIG. 3 is a flow chart of a method for controlling access to resources, according to some implementations. At step 302, a proxy device may receive a request from a client to access a resource provided by a server. As discussed above, in some implementations, the proxy device may be part of the server, while in other implementations, the proxy device may be deployed as an intermediary device. In some implementations (shown in dashed line), the proxy device may forward the request to the server immediately (or select a server from a plurality of servers and forward the request) as at step 310. In other implementations, the proxy device may identify a graph node or nodes corresponding to the request (e.g. a resource tree, and/or nodes within a resource tree) at step 304, and at step 306 may analyze a path from an entity corresponding to the client device to the node or nodes corresponding to the request. Based on the path analysis, the proxy device may determine whether access to the node is allowed or disallowed. If access is disallowed, then at step 308, the proxy device may block the request. Otherwise, the request may be forwarded to the server at step 310.

At step 312, the proxy device may receive the requested resource from the server. The resource may be received in any suitable format, including as compressed data, uncompressed data, encrypted data, a bitstream of raw data, or other formats. In some implementations in which the request was forwarded immediately, steps 304-306 may be performed after step 310 or 312 (shown in dotted line). Based on the path analysis, the proxy device may determine whether the resource should be forwarded to the client device without changes at step 314, or whether the resource should be modified at step 316. If the resource is to be modified according to the analysis of the graph, the proxy device may remove or replace data corresponding to nodes associated with rewrite or filter instructions with null data, random data, or other suitable data (e.g. average data aggregated from a large number of resources or records, etc.). The modified resource may then be forwarded to the client at step 314.

Accordingly, the systems and methods discussed herein provide for graph-based analysis, filtering, and access control. A knowledge graph may be generated for a resource and/or group of resources, with connections from nodes representing entities (e.g. devices, users, user groups, etc.) into nodes associated with the resource identifying access policies and authorization levels. Implementations utilizing a graph-based approach may be substantially faster than table-based access controls, particularly with very large and complex policy sets and large numbers of resources. Access controls may be applied in real time, and data may be dynamically filtered or cleaned to prevent exfiltration and protect privacy. Rules need not be explicitly or manually encoded, but rather may be implicit through the connections between resource nodes and entity nodes, allowing for high scalability.

In one aspect, the present disclosure is directed to a system for graph-based access control. The system includes a computing device comprising a processor and a memory device storing an access control graph. The processor is configured to: receive a request to access a data element of a resource; identify a target corresponding to the requested data value in an access control graph comprising a root node corresponding to the resource, one or more additional nodes corresponding to data elements of the resource, and one or more edges identifying a parent-child relationship between the root node and an additional node or between additional nodes; analyze a path from a node corresponding to a source of the request to the target, the path comprising an edge indicating an access policy; and responsive to the analysis, allow or disallow access in accordance with the indicated access policy to the data element of the resource.

In some implementations, the computing device comprises an intermediary device deployed between a client device and a server providing the resource, and the processor is further configured to receive the request to access the resource from the client device. In some implementations, the access policy indicates that access is not permitted, and the processor is further configured to block access to the data element. In some implementations, the access policy indicates that access is permitted, and the processor is further configured to allow access to the data element. In some implementations, the access policy indicates that access to a modified form of the data element is permitted and comprises instructions to modify the data element; and the processor is further configured to modify the data element in accordance with the instructions of the access policy; and allow access to the modified data element.

In some implementations, the processor is further configured to generate the access control graph responsive to receipt of the request to access the data element. In a further implementation, the processor is further configured to retrieve, responsive to receipt of the request to access the data element, the resource; and parse a hierarchical format of the resource to generate the access control graph.

In some implementations, the access control graph comprises a plurality of sub-graphs, each sub-graph comprising a root node corresponding to a different resource of a corresponding plurality of resources. In some implementations, the access control graph comprises a second one or more additional nodes corresponding to users or client devices, the second one or more additional nodes including the node corresponding to the source of the request. In a further implementation, the second one or more additional nodes further comprises at least one node corresponding to an access group, and one or more edges between a node corresponding to an access group and a node corresponding to a user or client device; and wherein the edge indicating the access policy is between the node corresponding to the access group and a node corresponding to a data element of the resource.

In another aspect, the present disclosure is directed to a method for graph-based access control. The method includes receiving, by a processor of a computing device, a request to access a data element of a resource. The method also includes identifying, by the processor, a target corresponding to the requested data value in an access control graph comprising a root node corresponding to the resource, one or more additional nodes corresponding to data elements of the resource, and one or more edges identifying a parent-child relationship between the root node and an additional node or between additional nodes. The method also includes analyzing, by the processor, a path from a node corresponding to a source of the request to the target, the path comprising an edge indicating an access policy. The method also includes, responsive to the analysis, allowing or disallowing access in accordance with the indicated access policy, by the processor, to the data element of the resource.

In some implementations, the computing device comprises an intermediary device deployed between a client device and a server providing the resource, and the method includes receiving the request, by the computing device from the client device. In some implementations, the access policy indicates that access is not permitted, and the method includes blocking, by the processor, access to the data element. In some implementations, the access policy indicates that access is permitted, and the method includes allowing, by the processor, access to the data element. In some implementations, the access policy indicates that access to a modified form of the data element is permitted and comprises instructions to modify the data element; and the method includes modifying, by the processor, the data element in accordance with the instructions of the access policy; and allowing, by the processor, access to the modified data element.

In some implementations, the method includes generating the access control graph, by the processor, responsive to receipt of the request to access the data element. In a further implementation, the method includes retrieving, by the processor responsive to receipt of the request to access the data element, the resource; and parsing, by the processor, a hierarchical format of the resource to generate the access control graph.

In some implementations, the access control graph comprises a plurality of sub-graphs, each sub-graph comprising a root node corresponding to a different resource of a corresponding plurality of resources. In some implementations, the access control graph comprises a second one or more additional nodes corresponding to users or client devices, the second one or more additional nodes including the node corresponding to the source of the request. In a further implementation, the second one or more additional nodes further comprises at least one node corresponding to an access group, and one or more edges between a node corresponding to an access group and a node corresponding to a user or client device; and the edge indicating the access policy is between the node corresponding to the access group and a node corresponding to a data element of the resource.

B. Computing Environment

Having discussed specific embodiments of the present solution, it may be helpful to describe aspects of the operating environment as well as associated system components (e.g., hardware elements) in connection with the methods and systems described herein.

Figure 4A:
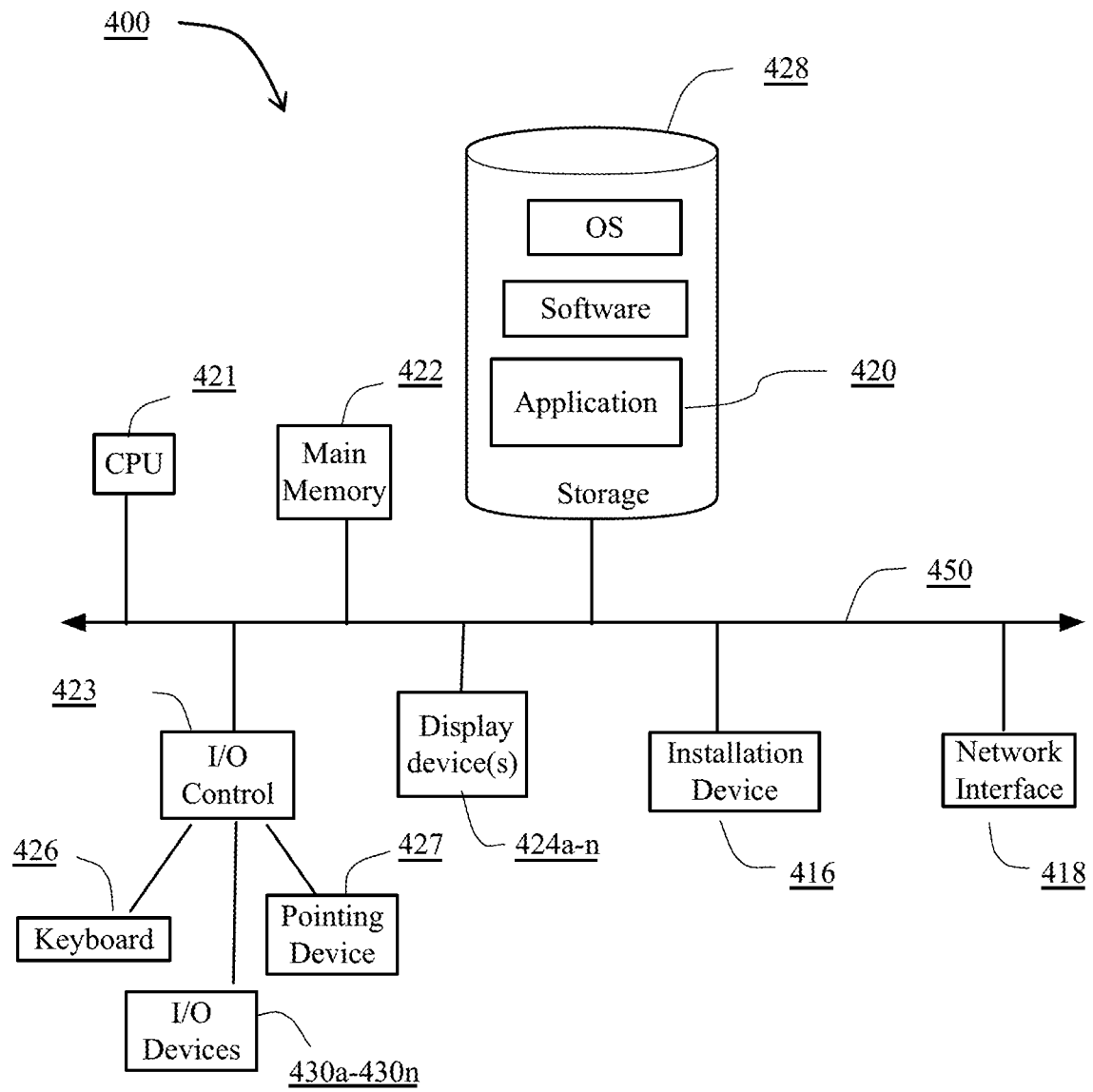
FIGS. 4A and 4B are block diagrams depicting embodiments of computing devices useful in connection with the methods and systems described herein.
Figure 4B:
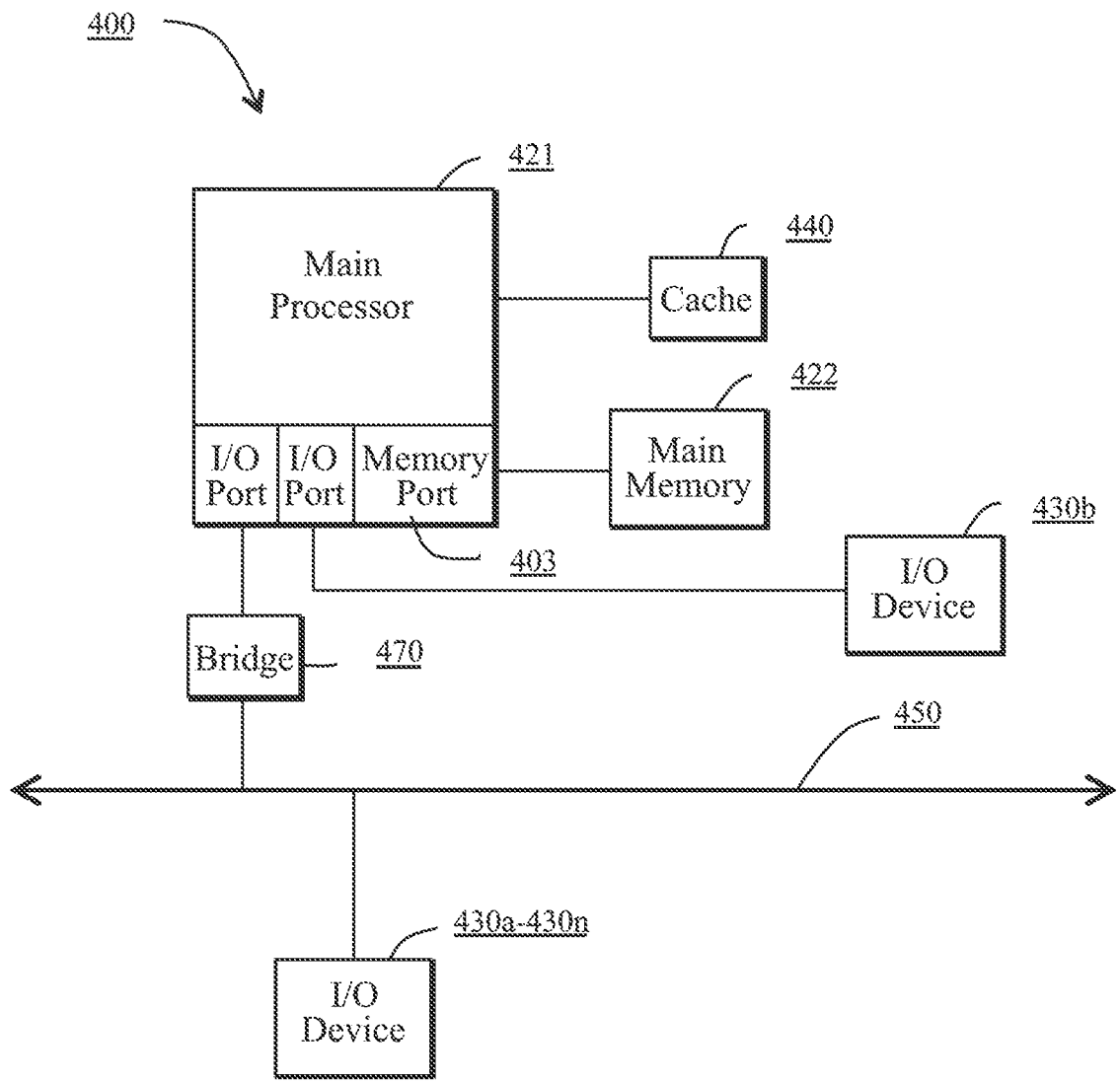

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of the wireless communication devices 402 or the access point 406. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor communicates directly with main memory 422 via a memory port 403. For example, in FIG. 4B the main memory 422 may be DRDRAM.

FIG. 4B depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4B depicts an embodiment of a computer 400 in which the main processor 421 may communicate directly with I/O device 430b, for example via HYPERTRANSPORT, RAPIDIO, or INFINIBAND communications technology. FIG. 4B also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, California Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A system for graph-based access control, comprising:
  a computing device comprising a processor and a memory device;
  wherein the processor is configured to:
    receive a request to access a data element of a resource,
    identify a target corresponding to the requested data value in an access control graph stored in the memory device comprising a plurality of sub-graphs, each sub-graph comprising a root node corresponding to a different resource of a corresponding plurality of resources, including a first sub-graph comprising a root node corresponding to the resource, one or more additional nodes corresponding to data elements of the resource, and one or more edges identifying a parent-child relationship between the root node and an additional node or between additional nodes, analyze a path from a node corresponding to a source of the request to the target, the path comprising an edge indicating an access policy, and responsive to the analysis, allow or disallow access in accordance with the indicated access policy to the data element of the resource.

2. The system of claim 1, wherein the computing device comprises an intermediary device deployed between a client device and a server providing the resource, and wherein the processor is further configured to receive the request to access the resource from the client device.

3. The system of claim 1, wherein the access policy indicates that access is not permitted, and wherein the processor is further configured to block access to the data element.

4. The system of claim 1, wherein the access policy indicates that access is permitted, and wherein the processor is further configured to allow access to the data element.

5. The system of claim 1, wherein the access policy indicates that access to a modified form of the data element is permitted and comprises instructions to modify the data element; and wherein the processor is further configured to:
modify the data element in accordance with the instructions of the access policy; and
allow access to the modified data element.

6. The system of claim 1, wherein the processor is further configured to generate the access control graph responsive to receipt of the request to access the data element.

7. The system of claim 6, wherein the processor is further configured to:
retrieve, responsive to receipt of the request to access the data element, the resource; and
parse a hierarchical format of the resource to generate the access control graph.

8. A system for graph-based access control, comprising:
a computing device comprising a processor and a memory device;
wherein the processor is configured to:
receive a request to access a data element of a resource,
identify a target corresponding to the requested data value in an access control graph, stored in the memory device, wherein the access control graph comprises a root node corresponding to the resource, one or more additional nodes corresponding to data elements of the resource, a second one or more additional nodes corresponding to users or client devices, the second one or more additional nodes including the node corresponding to the source of the request, and one or more edges identifying a parent-child relationship between the root node and an additional node or between additional nodes,
analyze a path from a node corresponding to a source of the request to the target, the path comprising an edge indicating an access policy, and
responsive to the analysis, allow or disallow access in accordance with the indicated access policy to the data element of the resource.

9. The system of claim 8, wherein the second one or more additional nodes further comprises at least one node corresponding to an access group, and one or more edges between a node corresponding to an access group and a node corresponding to a user or client device; and wherein the edge indicating the access policy is between the node corresponding to the access group and a node corresponding to a data element of the resource.

10. A method for graph-based access control, comprising:
receiving, by a processor of a computing device, a request to access a data element of a resource;
identifying, by the processor, a target corresponding to the requested data value in an access control graph comprising a root node corresponding to the resource, one or more additional nodes corresponding to data elements of the resource, a second one or more additional nodes corresponding to users or client devices, the second one or more additional nodes including the node corresponding to the source of the request, and one or more edges identifying a parent-child relationship between the root node and an additional node or between additional nodes;
analyzing, by the processor, a path from a node corresponding to a source of the request to the target, the path comprising an edge indicating an access policy; and
responsive to the analysis, allowing or disallowing access in accordance with the indicated access policy, by the processor, to the data element of the resource.

11. The method of claim 10, wherein the computing device comprises an intermediary device deployed between a client device and a server providing the resource, and wherein receiving the request to access the resource further comprises receiving the request, by the computing device from the client device.

12. The method of claim 10, wherein the access policy indicates that access is not permitted, and further comprising blocking, by the processor, access to the data element.

13. The method of claim 10, wherein the access policy indicates that access is permitted, and further comprising allowing, by the processor, access to the data element.

14. The method of claim 10, wherein the access policy indicates that access to a modified form of the data element is permitted and comprises instructions to modify the data element; and further comprising:
modifying, by the processor, the data element in accordance with the instructions of the access policy; and
allowing, by the processor, access to the modified data element.

15. The method of claim 10, further comprising generating the access control graph, by the processor, responsive to receipt of the request to access the data element.

16. The method of claim 15, wherein generating the access control graph further comprises:
retrieving, by the processor responsive to receipt of the request to access the data element, the resource; and
parsing, by the processor, a hierarchical format of the resource to generate the access control graph.

17. A method for graph-based access control, comprising:
receiving, by a processor of a computing device, a request to access a data element of a resource;
identifying, by the processor, a target corresponding to the requested data value in an access control graph, wherein the access control graph comprises a plurality of sub-graphs, each sub-graph comprising a root node corresponding to a different resource of a corresponding plurality of resources, and including a first sub-graph comprising a root node corresponding to the resource, one or more additional nodes corresponding to data elements of the resource, and one or more edges identifying a parent-child relationship between the root node and an additional node or between additional nodes;

analyzing, by the processor, a path from a node corresponding to a source of the request to the target, the path comprising an edge indicating an access policy; and responsive to the analysis, allowing or disallowing access in accordance with the indicated access policy, by the processor, to the data element of the resource.

18. The method of claim 17, wherein the first sub-graph comprises a second one or more additional nodes corresponding to users or client devices, the second one or more additional nodes including the node corresponding to the source of the request.

19. The method of claim 18, wherein the second one or more additional nodes further comprises at least one node corresponding to an access group, and one or more edges between a node corresponding to an access group and a node corresponding to a user or client device; and wherein the edge indicating the access policy is between the node corresponding to the access group and a node corresponding to a data element of the resource.

* * * * *